United States Patent
Chen (10) Patent No.: US 10,686,837 B2
(45) Date of Patent: Jun. 16, 2020

(54) METHOD AND DEVICE FOR CUSTOMIZING SECURITY SERVICE (71) Applicant: ZTE Corporation, Shenzhen (CN)

(72) Inventor: Xiaohua Chen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 560 days.

(21) Appl. No.: 15/031,811

(22) PCT Filed: Jul. 29, 2014

(86) PCT No.: PCT/CN2014/083229
§ 371 (c)(1),
(2) Date: Apr. 25, 2016

(87) PCT Pub. No.: WO2015/058569
PCT Pub. Date: Apr. 30, 2015

(65) Prior Publication Data
US 2016/0248811 A1    Aug. 25, 2016

(30) Foreign Application Priority Data

Oct. 25, 2013 (CN) .......................... 2013 1 0514151

(51) Int. Cl.
H04L 29/06    (2006.01)
G06F 21/53    (2013.01)
G06F 9/455    (2018.01)

(52) U.S. Cl.
CPC .......... *H04L 63/20* (2013.01); *G06F 9/45558* (2013.01); *G06F 21/53* (2013.01); *G06F 2009/45587* (2013.01)

(58) Field of Classification Search
CPC .......... G06F 2009/45587; G06F 21/53; G06F 9/45558; H04L 63/20
See application file for complete search history.

(56) References Cited

U.S. PATENT DOCUMENTS 8,095,929 B1 *  1/2012  Ji ........................... G06F 9/4856
                                                         709/223
8,250,213 B2 *  8/2012  Glover .................. H04L 47/781
                                                         709/220

(Continued)

FOREIGN PATENT DOCUMENTS

CN    102307185 A    1/2012
CN    102708316 A    10/2012

(Continued)

OTHER PUBLICATIONS

Translation of CN103139159 using Google Translate (dated Nov. 6, 2018), available from https://patentscope.wipo.int/search/en/search.jsf.*

(Continued)

*Primary Examiner* — Sharon S Lynch
(74) *Attorney, Agent, or Firm* — Cantor Colburn LLP (57) ABSTRACT The disclosure provides a method for customizing a security service and device, relates to the field of information security and solves the problem of incapability of an undiversified security service provision manner in meeting requirements of different tenants. The method includes that: a cloud computing data centre acquires at least one security service type selected by a tenant; and the cloud computing data centre executes corresponding security service according to the at least one security service type selected by the tenant. The technical solutions provided by the disclosure are applicable to a cloud computing system, and enables the cloud computing data centre to provide security service according to a requirement of the tenant.

6 Claims, 4 Drawing Sheets

(56) References Cited

U.S. PATENT DOCUMENTS

| | | | |
|---|---|---|---|
| 8,528,101 B1 | 9/2013 | Miller | |
| 8,850,026 B2* | 9/2014 | Glover | H04L 47/781 |
| | | | 709/222 |
| 8,909,928 B2* | 12/2014 | Ahmad | G06F 21/57 |
| | | | 713/168 |
| 9,047,107 B2* | 6/2015 | Walsh | G06F 9/455 |
| 9,930,070 B2* | 3/2018 | Feng | H04L 63/1408 |
| 10,135,679 B2* | 11/2018 | Huang | H04L 41/5054 |
| 10,348,767 B1* | 7/2019 | Lee | H04L 67/10 |
| 10,484,334 B1* | 11/2019 | Lee | H04L 63/0245 |
| 2009/0228579 A1* | 9/2009 | Sanghvi | H04L 41/0843 |
| | | | 709/224 |
| 2009/0254572 A1* | 10/2009 | Redlich | G06Q 10/06 |
| 2009/0300635 A1* | 12/2009 | Ferris | G06F 9/5072 |
| | | | 718/104 |
| 2010/0131624 A1* | 5/2010 | Ferris | G06F 9/5072 |
| | | | 709/221 |
| 2010/0175108 A1* | 7/2010 | Protas | G06F 21/53 |
| | | | 726/3 |
| 2011/0138050 A1* | 6/2011 | Dawson | G06F 9/5072 |
| | | | 709/226 |
| 2011/0161952 A1* | 6/2011 | Poddar | G06F 16/583 |
| | | | 717/173 |
| 2011/0219434 A1* | 9/2011 | Betz | G06F 21/00 |
| | | | 726/5 |
| 2011/0231899 A1* | 9/2011 | Pulier | G06F 9/45558 |
| | | | 726/1 |
| 2011/0295986 A1* | 12/2011 | Ferris | G06F 9/5072 |
| | | | 709/222 |
| 2011/0296529 A1 | 12/2011 | Bhanoo | |
| 2011/0302415 A1* | 12/2011 | Ahmad | G06F 21/57 |
| | | | 713/168 |
| 2012/0011077 A1* | 1/2012 | Bhagat | G06F 21/554 |
| | | | 705/317 |
| 2012/0131594 A1* | 5/2012 | Morgan | G06F 9/5072 |
| | | | 718/105 |
| 2012/0151568 A1* | 6/2012 | Pieczul | H04L 63/0815 |
| | | | 726/8 |
| 2012/0185913 A1* | 7/2012 | Martinez | G06F 9/455 |
| | | | 726/1 |
| 2012/0221696 A1* | 8/2012 | Ferris | H04L 67/327 |
| | | | 709/223 |
| 2012/0222084 A1* | 8/2012 | Beaty | H04L 43/0817 |
| | | | 726/1 |
| 2012/0239792 A1* | 9/2012 | Banerjee | H04L 67/1097 |
| | | | 709/223 |
| 2012/0254969 A1* | 10/2012 | Khosrova | G06F 21/41 |
| | | | 726/8 |
| 2012/0303740 A1* | 11/2012 | Ferris | G06F 17/30194 |
| | | | 709/217 |
| 2013/0007239 A1* | 1/2013 | Agarwal | H04L 63/02 |
| | | | 709/223 |
| 2013/0036449 A1* | 2/2013 | Mukkara | G06F 21/53 |
| | | | 726/1 |
| 2013/0055243 A1* | 2/2013 | Dandekar | G06F 9/45558 |
| | | | 718/1 |
| 2013/0066940 A1* | 3/2013 | Shao | H04L 67/1025 |
| | | | 709/201 |
| 2013/0179495 A1* | 7/2013 | Eom | G06F 9/5072 |
| | | | 709/203 |
| 2013/0227561 A1* | 8/2013 | Walsh | G06F 9/455 |
| | | | 718/1 |
| 2013/0297795 A1* | 11/2013 | McGrath | G06F 9/452 |
| | | | 709/226 |
| 2014/0019960 A1* | 1/2014 | Jacklin | G06F 9/45558 |
| | | | 718/1 |
| 2014/0040473 A1* | 2/2014 | Ho | G06F 9/5072 |
| | | | 709/226 |
| 2014/0074539 A1* | 3/2014 | Doering | G06Q 10/06315 |
| | | | 705/7.25 |
| 2014/0075031 A1* | 3/2014 | Doering | H04L 41/5041 |
| | | | 709/226 |
| 2014/0101656 A1* | 4/2014 | Zhu | H04L 63/0227 |
| | | | 718/1 |
| 2014/0123135 A1* | 5/2014 | Huang | H04L 41/5054 |
| | | | 718/1 |
| 2014/0196113 A1* | 7/2014 | Chen | H04L 63/20 |
| | | | 726/3 |
| 2014/0245423 A1* | 8/2014 | Lee | H04L 63/0218 |
| | | | 726/12 |
| 2015/0033365 A1* | 1/2015 | Mellor | H04L 63/102 |
| | | | 726/29 |
| 2015/0067783 A1* | 3/2015 | Pulier | G06F 9/45558 |
| | | | 726/3 |
| 2015/0244693 A1* | 8/2015 | Pate | G06F 21/6218 |
| | | | 713/165 |
| 2015/0339136 A1* | 11/2015 | Suryanarayanan | G06F 9/455 |
| | | | 718/1 |
| 2015/0341318 A1* | 11/2015 | Lee | H04L 63/0218 |
| | | | 726/11 |
| 2016/0080201 A1* | 3/2016 | Huang | H04L 41/5054 |
| | | | 709/221 |
| 2017/0078302 A1* | 3/2017 | Mellor | H04L 63/102 |
| 2018/0131629 A1* | 5/2018 | Pulier | G06F 9/45558 |
| 2019/0089589 A1* | 3/2019 | Huang | H04L 41/5054 |

FOREIGN PATENT DOCUMENTS

| | | |
|---|---|---|
| CN | 102904892 A | 1/2013 |
| CN | 102947854 A | 2/2013 |
| CN | 103139159 A | 6/2013 |
| CN | 103139195 A | 6/2013 |
| CN | 103607426 A | 2/2014 |
| JP | 2013196343 A | 9/2013 |
| WO | 2013138979 A1 | 9/2013 |

OTHER PUBLICATIONS

International Search Report for Application No. PCT/CN2014/083229 filed on Jul. 29, 2014; dated Oct. 15, 2014.

European Search Report for corresponding application EP 14 85 6207: Report dated Jul. 18, 2016.

Zhi-Yuan Hu:, "Safety Communication Among Virtual Machines in Cloud Computing Framework", Jun. 5, 2013, pp. 1-32, XP055288737.

* cited by examiner

Security capabilities for subscription

☐ Security inspection
☐ Security inspection, configured to ......
  Securityre inforcement
☐ Password cracking protection
☐ High-risk vulnerability scanning
☐ WEB service scanning
☐ ... ...

Subscribed security capabilities

| Security inspection | Enable | Suspend | Unsubscribe | ... ... |
| Security reinforcement | Enable | Suspend | Unsubscribe | ... ... |
| High-risk vulnerability scanning | Enable | Suspend | Unsubscribe | ... ... |
| WEB service scanning | Enable | Suspend | Unsubscribe | ... ... |
| ... ... | Enable | Suspend | Unsubscribe | ... ... |

METHOD AND DEVICE FOR CUSTOMIZING SECURITY SERVICE

TECHNICAL FIELD

The embodiments of the disclosure relate to the field of information security, and in particular to a method and device for customizing a security service.

BACKGROUND

A cloud computing data centre not only manages equipment of a client, but also manages a computing capability and Information Technology (IT) availability. In the case that data is transmitted at a cloud end, the cloud computing data centre allocates a computing capability required by the transmitted data, and manages a background of the whole infrastructure. Operation maintenance for software and hardware is performed. A cloud platform is continuously debugged on a software level according to actual network usage, and normal operation allocation of a machine room environment and network resources is ensured on a hardware level. The cloud computing data centre implements the whole IT solution and the client can be totally endowed with sufficient computing capability (like water and electricity supply) without worrying about what is supposed to be done in the background.

When a tenant uses a service provided by the cloud computing data centre, security service is essential. However, since different tenants have different requirement on the security in the cloud computing data centre, and the same tenant may also use different resources for different purposes, in order to increase a utilization rate of security resources, different security service measures may be used. Therefore, a undiversified manner for providing a security service may not meet the requirements of different tenants.

SUMMARY

The embodiments of the disclosure provide a method and device for customizing security service, to solve the problem of incapability of an undiversified security service provision manner in meeting requirements of different tenants.

The embodiment of the disclosure provides a method for customizing security service, which may include that:

a cloud computing data centre acquires at least one security service type selected by a tenant; and the cloud computing data centre executes corresponding security service according to the at least one security service type selected by the tenant.

In an embodiment of the disclosure, the step that the cloud computing data centre acquires the at least one security service type selected by the tenant may include that:

the cloud computing data centre determines at least one security service type of a virtual machine tenanted by the tenant after receiving a resource list sent by the tenant, wherein the resource list contains the virtual machine requested to be tenanted by the tenant and a parameter of the virtual machine;

the cloud computing data centre provides at least one determined security service type suitable for the virtual machine for the tenant to select; and the cloud computing data centre receives information about at least one security service type selected by the tenant.

In an embodiment of the disclosure, the step that the cloud computing data centre provides the at least one determined security service type suitable for the virtual machine for the tenant to select may specifically be implemented as follows:

the cloud computing data centre generates an optional security service type list according to the information about the at least one determined security service type suitable for the virtual machine, wherein the optional security service type list includes multiple entries and each entry corresponds to information about one optional security service type.

In an embodiment of the disclosure, the step that the cloud computing data centre receives the information about the at least one at least one security service type selected by the tenant may specifically be implemented as follows:

the cloud computing data centre receives a selected security service type list returned by the tenant, the selected security service type list containing at least one optional at least one security service type selected by the tenant.

In an embodiment of the disclosure, the step that the cloud computing data centre determines the at least one security service type of the virtual machine tenanted by the tenant after receiving the resource list sent by the tenant may specifically be implemented as follows:

the cloud computing data centre determines the at least one security service type suitable for the virtual machine as the optional at least one security service type according to the parameter of the virtual machine.

In an embodiment of the disclosure, the method may further include that:

a virtual machine security service type list of the tenant is configured in a security component of an access gateway, the virtual machine security service type list including the at least one security service type selected by the tenant.

In an embodiment of the disclosure, the step that the cloud computing data centre acquires the at least one security service type selected by the tenant may include that:

in the case that the tenant accesses the cloud computing data centre through the access gateway, the security component sends the virtual machine security service type list to the cloud computing data centre; and the cloud computing data centre determines the at least one security service type selected by the tenant according to the virtual machine security service type list.

In an embodiment of the disclosure, the step that the cloud computing data centre acquires the at least one security service type selected by the tenant may include that:

the cloud computing data centre determines the at least one security service type of the virtual machine tenanted by the tenant after receiving a virtual machine application sent by the tenant, the virtual machine application containing the virtual machine requested to be tenanted by the tenant, the parameter of the virtual machine and the at least one security service type requested by the tenant;

the cloud computing data centre determines the optional at least one security service type of the tenant according to the parameter of the virtual machine; and the cloud computing data centre determines the optional at least one security service type requested by the tenant as the at least one security service type selected by the tenant.

In an embodiment of the disclosure, after the step that the cloud computing data centre executes the corresponding security service according to the at least one security service type selected by the tenant, the method may further include that:

the cloud computing data centre feeds back a result of execution of the security service corresponding to the at least one at least one security service type selected by the tenant to the tenant.

The embodiment of the disclosure further provides another method for customizing security service, which may include that:

a tenant selects required at least one security service type; and the tenant submits the selected at least one security service type to a cloud computing data centre, and makes a request for corresponding security service.

In an embodiment of the disclosure, the step that the tenant selects the required at least one security service type may include that:

the tenant sends a resource list to the cloud computing data centre, the resource list containing a virtual machine requested to be tenanted by the tenant and a parameter of the virtual machine;

the tenant receives at least one security service type returned by the cloud computing data centre; and the tenant selects at least one optional security service type from an optional security service type list.

In an embodiment of the disclosure, the step that the tenant receives the at least one security service type returned by the cloud computing data centre may specifically be implemented as follows:

the tenant receives the optional security service type list returned by the cloud computing data centre, the optional security service type list including multiple entries and each entry corresponding to information about an optional security service type.

In an embodiment of the disclosure, the step that the tenant submits the selected at least one security service type to the cloud computing data centre and makes the request for the corresponding security service may include that:

the tenant generates a selected security service type list according to the information about the selected at least one optional security service type, the selected security service type list containing at least one optional security service type selected by the tenant; and the tenant sends the selected security service type list to the cloud computing data centre.

In an embodiment of the disclosure, the step that the tenant selects the required at least one security service type may include that:

the tenant configures a virtual machine security service type list of the tenant in a security component of an access gateway, the virtual machine security service type list including the at least one security service type selected by the tenant.

In an embodiment of the disclosure, the step that the tenant submits the selected at least one security service type to the cloud computing data centre and makes the request for the corresponding security service may include that:

in the case that the tenant accesses the cloud computing data centre through the access gateway, the security component sends the virtual machine security service type list to the cloud computing data centre.

In an embodiment of the disclosure, the step that the tenant submits the selected at least one security service type to the cloud computing data centre and makes the request for the corresponding security service may include that:

the tenant sends a virtual machine application to the cloud computing data centre, the virtual machine application containing the virtual machine requested to be tenanted by the tenant, the parameter of the virtual machine and the at least one security service type requested by the tenant.

In an embodiment of the disclosure, after the step that the tenant submits the selected at least one security service type to the cloud computing data centre and makes the request for the corresponding security service, the method may further include that:

the tenant receives a result, fed back by the cloud computing data centre, of execution of the security service corresponding to the at least one security service type.

The embodiment of the disclosure further provides a device for customizing security service, which may include:

a service type acquisition component, configured to acquire at least one security service type selected by a tenant; and a service execution component, configured to execute corresponding security service according to the at least one security service type selected by the tenant.

In an embodiment of the disclosure, the service type acquisition component may include:

a first request receiving unit, configured to determine at least one security service type of a virtual machine tenanted by the tenant after receiving a resource list sent by the tenant, the resource list containing the virtual machine requested to be tenanted by the tenant and a parameter of the virtual machine;

a first service provision unit, configured to provide at least one determined security service type suitable for the virtual machine for the tenant to select; and a first selection receiving unit, configured to receive information about at least one security service type selected by the tenant.

In an embodiment of the disclosure, the service type acquisition component may further include:

a second selection receiving unit, configured to receive a virtual machine security service type list sent by a security component in the case that the tenant accesses a cloud computing data centre through an access gateway, and determine the at least one security service type selected by the tenant according to the virtual machine security service type list.

In an embodiment of the disclosure, the service type acquisition component may further include:

a third request receiving unit, configured to determine the at least one security service type of the virtual machine tenanted by the tenant after receiving a virtual machine application sent by the tenant, the virtual machine application containing the virtual machine requested to be tenanted by the tenant, the parameter of the virtual machine and at least one security service type requested by the tenant;

a third optional determination unit, configured to determine optional at least one security service type of the tenant according to the parameter of the virtual machine; and a third selection unit, configured to determine the optional at least one security service type requested by the tenant as the at least one security service type selected by the tenant.

In an embodiment of the disclosure, the device may further include: a result feedback component, configured to feed back a result of execution of the security service corresponding to the at least one security service type selected by the tenant to the tenant.

The embodiment of the disclosure provides the method and device for customizing security service, the cloud computing data centre acquires the at least one security service type selected by the tenant, and the cloud computing data centre executes the corresponding security service according to the at least one security service type selected by the tenant, so that the cloud data service may provide security service according to a requirement of the tenant, and the problem of incapability of the undiversified security service provision manner in meeting the requirements of different tenants is solved.

DETAILED DESCRIPTION OF THE EMBODIMENTS

Security service is rich in content, and includes basic security service: encryption, authentication, non-repudiation, integrity protection and the like; and application security service: online scanning, intrusion detection, security warning, content monitoring and the like. A tenant usually knows better a security requirement than a service provider in the case that selecting to tenant a resource of a cloud computing data centre.

In order to solve the problem, the embodiment of the disclosure provides a method for customizing the security service, security service may be maintained as a resource pool in a cloud computing data centre, and a tenant selects security service to be implemented for a resource.

The embodiment of the disclosure will be described below with reference to the drawings in detail. It is important to note that the embodiment in the disclosure and characteristics in the embodiment may be freely combined under the condition of no conflicts.

It is necessary for a cloud computing data centre to manage security resources in a centralized manner in the case that implementing pooling of physical resources, including the security resources. Centralized security resource management and operation maintenance may improve utilization efficiency and management efficiency of the resources of the cloud computing data centre. The security resources may be utilized to externally provide security service, which includes security detection service such as security scanning service, vulnerability scanning service, webpage scanning service, tamper-proofing scanning service, port scanning service, Trojan scanning service and traffic monitoring service, and security protection service such as security reinforcement service, password strengthening service, Trojan embedding prevention service, antivirus service, data stream cleaning service and firewall service.

Obtaining a required resource in an easy-to-extend requirement-based manner through a network is one of characteristics of cloud computing. In the cloud computing data centre, security and reliability are the most concerns of a tenant. Therefore, various security protection measures of the cloud computing data centre are extremely important. At present, a security service manner of the cloud computing data centre runs in background to provide security guarantee for the cloud computing data centre as default, and the cloud computing data centre manages and allocates the security service in a unified manner. All conventional security service strategies are based on a unified strategy, and security service for resource acquisition of tenants is substantially the same. Tenants may not participate in resource security service provision service.

In the cloud computing data centre, for different service types, tenants may have different security requirements. For the same service type, different tenants may also have different security requirements. Moreover, from the angle of the cloud computing data centre, providing unified security protection for different resources of different tenants may not accurately meet requirements of the tenants, and may also not efficiently configure security resources. Therefore, the cloud computing data centre may only be responsible for maintenance of the security resources and execution and feedback of the security service to improve participation of the tenants and improve tenant experiences of the tenants in the security service. Types and strength of the security service are selected by the tenants, and the tenants determine security protection types for tenanted resources.

For example, the cloud computing data centre maintains security resources of system configuration checking, system vulnerability checking, system security reinforcement, system patch reinforcement and the like; and before a tenant selects security service to be executed, the cloud computing data centre does not execute the security service, and after the tenant customizes security service, the cloud computing data centre is responsible for execution of the security service and feedback of an execution result to the tenant.

According to the method for customizing security service provided by the embodiment of the disclosure, a tenant selects to-be-executed at least one security service type, and the cloud computing data centre determines at least one security service type available to a virtual machine after the tenant submits a virtual machine tenanting requirement, provides the at least one security service type for the tenant to select, and executes security protection for the virtual machine of the tenant according to the at least one security service type selected by the tenant.

Figure 1:
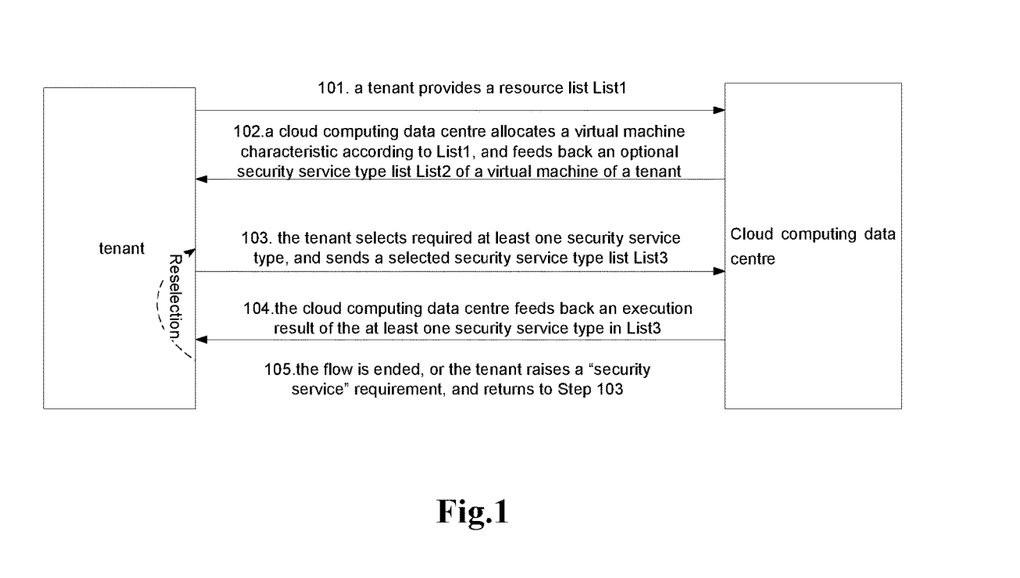
FIG. 1 is a flowchart of a method for customizing a security service according to embodiment 1 of the disclosure.

Embodiment 1 of the disclosure will be described below with reference to the drawings. The embodiment of the disclosure provides a method for customizing security service, and as shown in FIG. 1, a flow of providing security service for a tenant by virtue of the method includes:

Step 101: a tenant submits a resource list List1 to a cloud computing data centre, including a parameter (such as a Central Processing Unit (CPU), a memory and a DISK) requirement of a virtual machine, and clearly describes an operating system to be preinstalled in the virtual machine and a service type;

Step 102: the cloud computing data centre performs analysis to comb out at least one security service type suitable for the virtual machine as optional at least one security service type according to List1 and an existing strategy, makes an optional security service type list List2 and feeds back List2 to the tenant, wherein for example, the security strategy may be specifying a system configuration checking content according to a type of the operating system, and different system configuration checking is performed on different systems;

step 103: the tenant selects at least one optional security service type from List2 to form a selected security service type list List3, and sends List3 to the cloud computing data centre, wherein List3 is a subset of List2;

Step 104: the cloud computing data centre performs security detection and protection on the virtual machine according to List3, and feeds back a security result to the tenant; and Step 105: the tenant may select whether to reselect security service or not according to the security result, and returns to Step 103 if it is necessary to reselect the security service.

Figure 2:
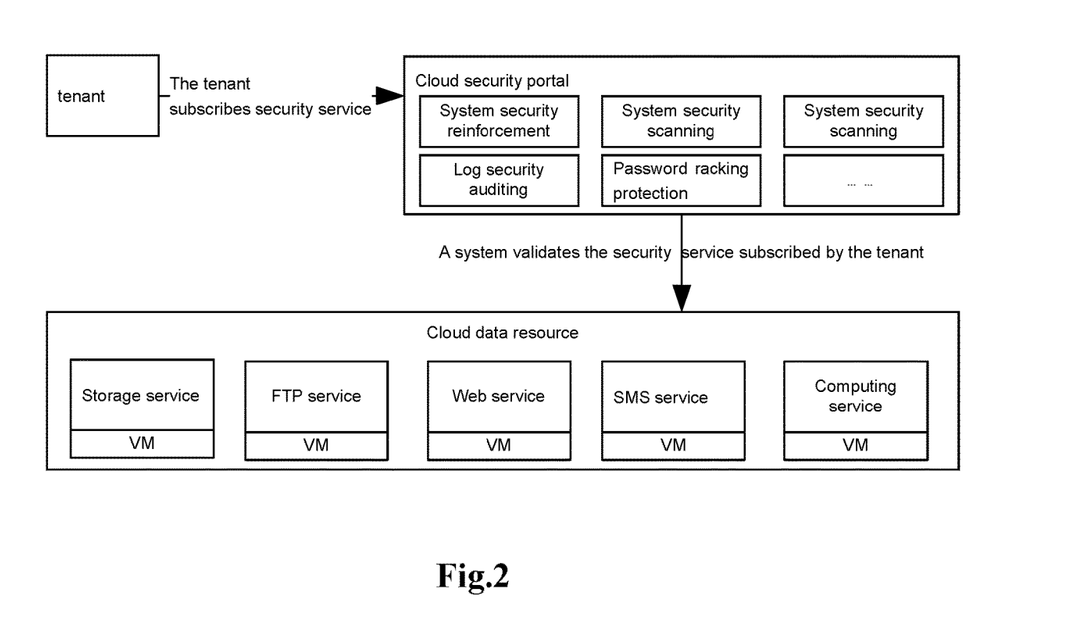
FIG. 2 is a flowchart of another method for customizing the security service according to embodiment 1 of the disclosure.
Figure 3:
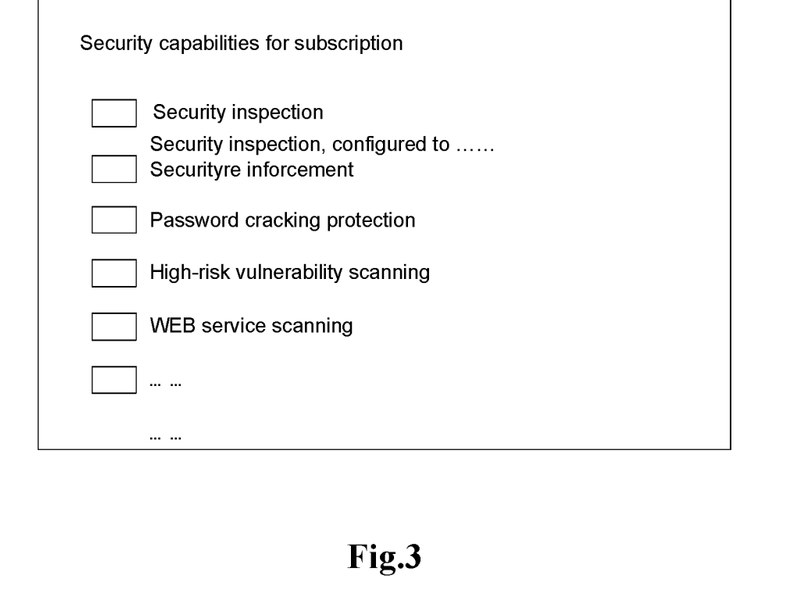
FIG. 3 is a diagram of an optional security service list according to embodiment 2 of the disclosure.
Figure 4:
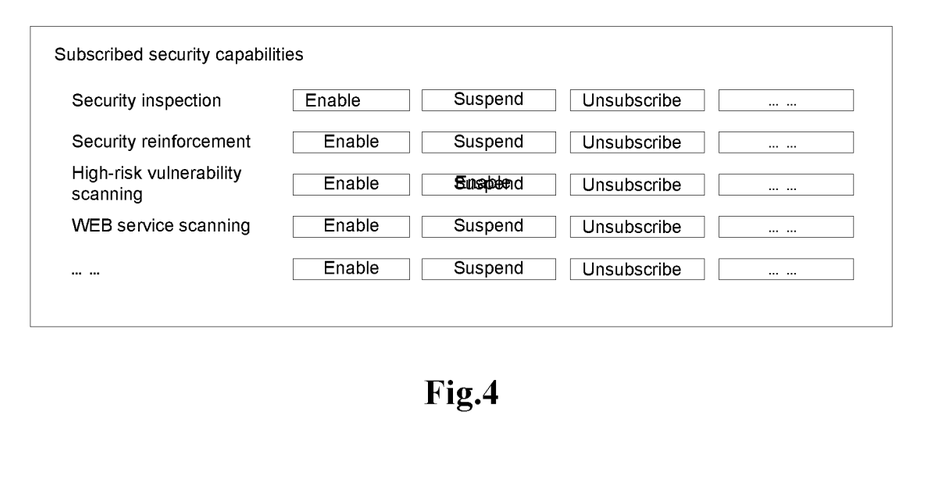
FIG. 4 is a diagram of a selected security service type list according to embodiment 2 of the disclosure.

Specific implementation of the flow shown in FIG. 1 is shown in FIG. 2, the cloud computing data centre provides a security service list for the tenant through a web portal or a client, and the tenant may select a required security service type from the security service list, a specific flow including:

Step 201: the tenant logs in the web portal or client of the cloud computing data centre, submits the virtual machine resource list List1 in the web portal or the client, and sends List1 to the cloud computing data centre;

Step 202: the cloud computing data centre returns the optional security service type list List2 to the tenant according to List1, as shown in FIG. 3, and the tenant may select required at least one security capability (security service type) through an interface shown in FIG. 3;

Step 203: the tenant selects the at least one security service type to form the selected security service type list List3, as shown in FIG. 4, specific implementation of List3 being: a subscribed security capability list, and sends List3 to the cloud computing data centre;

Step 204: the cloud computing data centre executes security detection and protection according to List3, and feeds back the security result to the tenant; and Step 205: the tenant checks the security result, and determines whether to reselect the at least one security service type or not.

Embodiment 2 of the disclosure will be described below with reference to the drawings.

Figure 5:
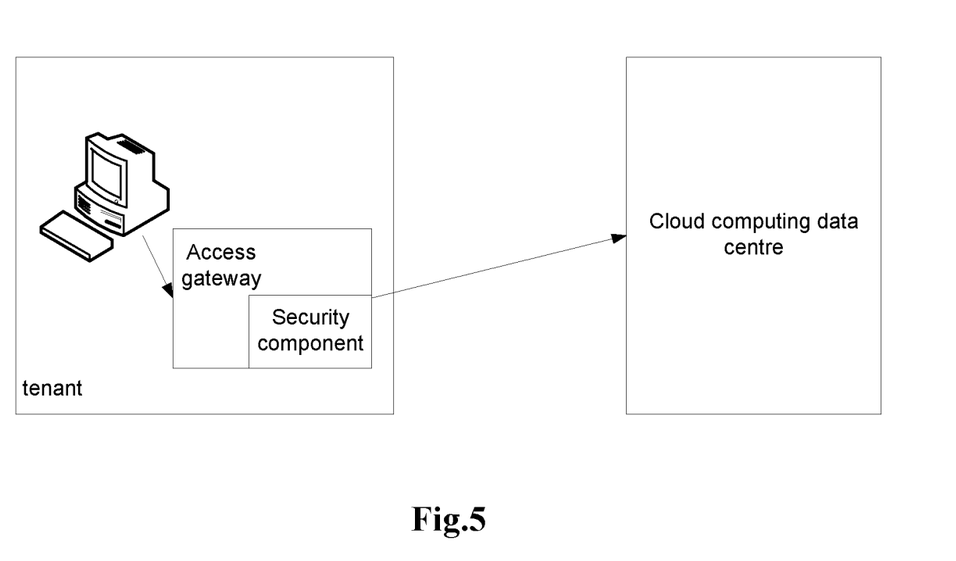
FIG. 5 is a diagram of a network architecture adopted in embodiment 3 of the disclosure.

The embodiment of the disclosure provides a method for customizing security service, security service selection is implemented through a security component in an access gateway provided by a cloud computing data centre, and network architecture is shown in FIG. 5.

The security component is responsible for interacting with the cloud computing data centre and sending and receiving security service type information. For example, at least one security service type is set in the security component of the access gateway in advance. In the case that a tenant uses a virtual machine resource through the security component, the security component may transmit the at least one security service type to the cloud computing data centre, and the cloud computing data centre performs security detection and protection on the virtual machine according to the at least one security service type of the security component.

A function of the security component may also be extended, and for example, the security component may judge a condition of the access gateway of the tenant according to a predefined strategy, to regulate the at least one security service type. For example, in the case that the access gateway discovers that an access environment of the tenant is a public network, the security component may add a security service type corresponding to the public network, or increase execution strength of the existing service types of the security component.

A virtual machine security service type list of the tenant is configured in the security component of the access gateway, and the virtual machine security service type list includes the at least one security service type selected by the tenant.

The virtual machine security service type list may be set by the cloud computing data centre or a user with a right such as the tenant in a remote connection manner or another manner.

Description about a Flow:

1: in the case that the tenant accesses a virtual machine system of the cloud computing data centre through the access gateway, the security component in the access gateway sends the virtual machine security service type list to the cloud computing data centre;

2: the cloud computing data centre performs security detection and protection on the virtual machine according to the virtual machine security service type list, and feeds back an execution result to the tenant; and 3: the tenant may judge whether to regulate the at least one security service type or not according to the execution result.

Embodiment 3 of the disclosure will be described below with reference to the drawings.

A tenant sends expected at least one security service type and virtual machine resources together with a service requirement to a cloud computing data centre in the case that sending a virtual machine application, and the cloud computing data centre judges whether to execute these security service types or not as well as execution strength and the like according to a strategy, and feeds back the executed at least one security service type and an execution result to the tenant.

Description about a Flow:

1: the tenant submits the virtual machine application to the cloud computing data centre, including a virtual machine resource list List1 with contents the same as those in embodiment 1, and a list List2 of the security service type requested by the tenant;

2: the cloud computing data centre screens a list List3 of information such as the security service type available for the virtual machine and execution strength from List2 according to a security strategy and List1, the cloud computing data centre executes the screened security service type List3, and feeds back a security execution result and List3 to the tenant, and the cloud computing data centre may optionally send List4 of the security service type suggested to be executed for the virtual machine by the tenant to the tenant at the same time; and 3: the tenant checks List3 and checks the security execution result, or checks List4 and reinitiates a security service type selection application.

Embodiment 4 of the disclosure will be described below with reference to the drawings.

Figure 6:
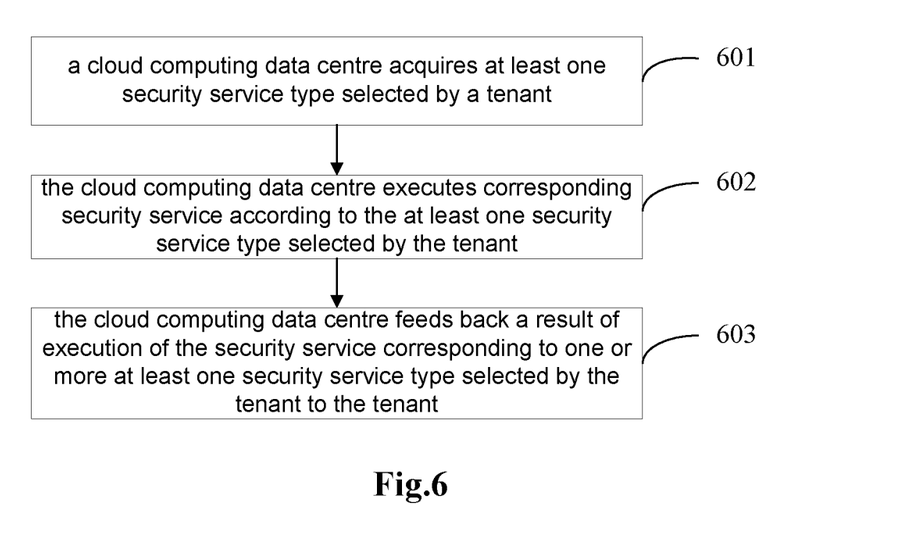
FIG. 6 is a flowchart of a method for customizing the security service according to embodiment 4 of the disclosure.

The embodiment of the disclosure provides a method for customizing the security service, and as shown in FIG. 6, a flow of providing security service for a tenant by a cloud computing data centre by virtue of the method includes:

Step 601: the cloud computing data centre acquires at least one security service type selected by the tenant.

In the step, the tenant selects the required at least one security service type, and submits the selected at least one security service type to the cloud computing data centre to request for corresponding security service; and then the cloud computing data centre acquires the at least one security service type selected by the tenant.

In the step, there are specifically three implementation manners, which will be respectively described below.

Manner 1:

the tenant sends a resource list to the cloud computing data centre, and the cloud computing data centre determines at least one security service type of a virtual machine tenanted by the tenant after receiving the resource list sent by the tenant, the resource list containing the virtual machine requested to be tenanted by the tenant and a parameter of the virtual machine;

specifically, the cloud computing data centre determines at least one security service type suitable for the virtual machine as optional at least one security service type according to the parameter of the virtual machine;

2: the cloud computing data centre generates an optional security service type list according to information about the determined at least one security service type suitable for the virtual machine, the optional security service type list including multiple entries and each entry corresponding to information about an optional security service type;

the tenant selects one or more optional security service types from the optional list security service type list, and generates a selected security service type list according to the information about the selected optional security service types, the type list selected security service type list containing the at least one optional security service type selected by the tenant, and the tenant sends the selected security service type list to the cloud computing data centre; and 3: the cloud computing data centre receives the selected security service type list returned by the tenant, the selected security service type list containing the at least one optional security service type selected by the tenant.

Manner 2:

1: the tenant configures a virtual machine security service type list of the tenant in a security component of an access gateway, the virtual machine security service type list including the at least one security service type selected by the tenant;

2: in the case that the tenant accesses the cloud computing data centre through the access gateway, the security component sends the security service type list of the virtual machine type list to the cloud computing data centre; and 3: the cloud computing data centre determines the at least one security service type selected by the tenant according to the virtual machine security service type list.

Manner 3:

1: the tenant sends a virtual machine application to the cloud computing data centre, the virtual machine application containing the virtual machine requested to be tenanted by the tenant, the parameter of the virtual machine and the at least one security service type requested by the tenant; the cloud computing data centre determines the at least one security service type of the virtual machine tenanted by the tenant after receiving the virtual machine application sent by the tenant;

2: the cloud computing data centre determines the optional at least one security service type of the tenant according to the parameter of the virtual machine; and 3: the cloud computing data centre determines the optional at least one security service type requested by the tenant as the at least one security service type selected by the tenant.

Step 602: the cloud computing data centre executes corresponding security service according to the at least one security service type selected by the tenant.

After finishing determining the at least one security service type selected by the tenant in Step 601, the cloud computing data centre may execute the security service corresponding to the at least one security service type, and obtains execution result data.

Step 603: the cloud computing data centre feeds back a result of execution o the security service corresponding to the at least one security service type selected by the tenant to the tenant.

Embodiment 5 of the disclosure will be described below with reference to the drawings.

Figure 7:
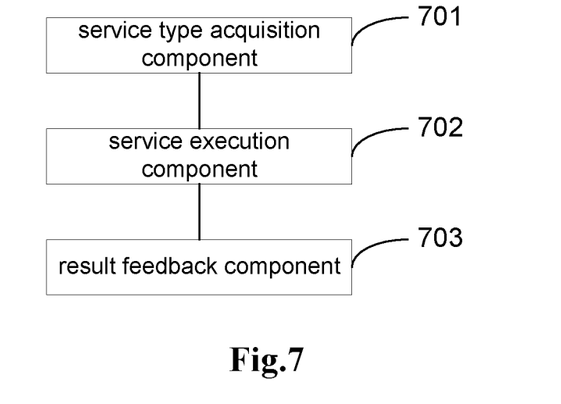
FIG. 7 is a structure diagram of a device for customizing the security service according to embodiment 5 of the disclosure.

The embodiment of the disclosure provides a device for customizing security service, which, as shown in FIG. 7, structurally includes:

a service type acquisition component 701, configured to acquire at least one security service type selected by a tenant; and a service execution component 702, configured to execute corresponding security service according to the at least one security service type selected by the tenant.

Figure 8:
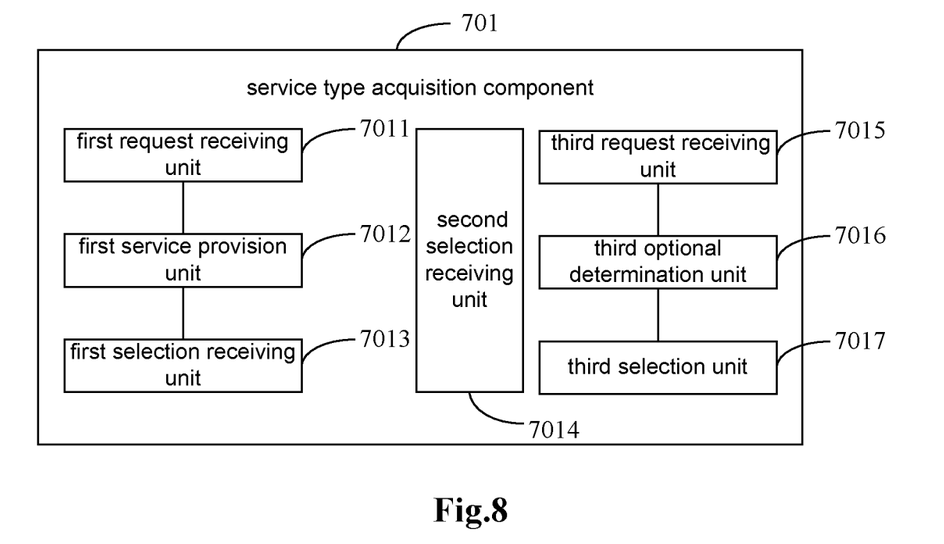
FIG. 8 is a structure diagram of a service type acquisition component 701 in FIG. 7.

In an embodiment of the disclosure, the service type acquisition component 701, as shown in FIG. 8, structurally includes:

a first request receiving unit 7011, configured to determine at least one security service type of a virtual machine tenanted by the tenant after receiving a resource list sent by the tenant, the resource list containing the virtual machine requested to be tenanted by the tenant and a parameter of the virtual machine;

a first service provision unit 7012, configured to provide one or more determined security service types suitable for the virtual machine for the tenant to select; and a first selection receiving unit 7013, configured to receive information about at least one security service type selected by the tenant.

In an embodiment of the disclosure, the service type acquisition component 701 further includes:

a second selection receiving unit 7014, configured to receive a virtual machine security service type list sent by a security component in the case that the tenant accesses a cloud computing data centre through an access gateway, and determine the at least one security service type selected by the tenant according to the virtual machine security service type list.

In an embodiment of the disclosure, the service type acquisition component 701 further includes:

a third request receiving unit 7015, configured to determine the at least one security service type of the virtual machine tenanted by the tenant after receiving a virtual machine application sent by the tenant, the virtual machine application containing the virtual machine requested to be tenanted by the tenant, the parameter of the virtual machine and one or more security service types requested by the tenant;

a third optional determination unit 7016, configured to determine optional at least one security service type of the tenant according to the parameter of the virtual machine; and a third selection unit 7017, configured to determine the optional at least one security service type requested by the tenant as the at least one security service type selected by the tenant.

In an embodiment of the disclosure, the device further includes:

a result feedback component 703, configured to feed back a result of execution of the security service corresponding to the at least one security service type selected by the tenant to the tenant.

The device for customizing security service may be integrated in the cloud computing data centre, and the cloud computing data centre finishes the corresponding functions.

The embodiment of the disclosure provides the method for customizing security service and device, the cloud computing data centre acquires the at least one security service type selected by the tenant, and the cloud computing data centre executes the corresponding security service according to the at least one security service type selected by the tenant, so that the cloud data service may provide security service according to a requirement of the tenant, and the problem of incapability of the undiversified security service provision manner in meeting the requirements of different tenants is solved.

Those skilled in the art may understand that all or part of steps of the embodiment may be implemented by virtue of a computer program, the computer program may be stored in a computer-readable storage medium, and the computer program is executed on a corresponding hardware platform (such as a system, equipment, a device and an apparatus), including one or combination of the steps of the method embodiments during execution.

Optionally, all or part of the steps of the embodiment may also be implemented by an integrated circuit, these steps may form integrated circuit components respectively, or multiple components or steps therein may form a single integrated circuit component for implementation. Therefore, the disclosure is not limited by any specific hardware and software combination.

Each device/function component/function unit in the embodiment may be implemented by a universal computing device, and they may be concentrated in a single computing device, and may also be distributed on a network formed by multiple computing devices.

Each device/function component/function unit in the embodiment may be stored in a computer-readable storage medium in the case that being implemented in form of software function component or sold or used as an independent product. The abovementioned computer-readable storage medium may be a read-only memory, a magnetic disk, a compact disc or the like.

Any variation or replacement apparent to those skilled in the art within the technical scope of the disclosure shall fall within the scope of protection of the disclosure. Therefore, the scope of protection of the disclosure shall be subject to the scope of protection of the claims.

INDUSTRIAL APPLICABILITY

The embodiments of the disclosure provide a method and device for customizing the security service, a cloud computing data centre acquires at least one security service type selected by a tenant, and the cloud computing data centre executes corresponding security service according to the at least one security service type selected by the tenant, so that the cloud data service may provide security service according to a requirement of the tenant, and the problem of incapability of an undiversified security service provision manner in meeting requirements of different tenants is solved.

What is claimed is:

1. A method for customizing a security service, comprising:
   receiving a request and a virtual machine application from a tenant, wherein the request is for tenanting a virtual machine and the virtual machine application comprises a requested strength of a security service, a resource list for the virtual machine containing the virtual machine requested to be tenanted by the tenant and a parameter requirement of the tenant for the virtual machine;
   tenanting, by the tenant, the requested virtual machine;
   acquiring, by a cloud computing data centre, one or more security service types selected by a tenant, wherein the one or more security service types comprise at least one of the following:
      a security detection service and a security protection service, and
      the security detection service comprises at least one of the following: security scanning service, vulnerability scanning service, webpage scanning service, tamper-proofing scanning service, port scanning service, Trojan scanning service and traffic monitoring service; and
      the security protection service comprises at least one of the following: password strengthening service, Trojan embedding prevention service, antivirus service, data stream cleaning service and firewall service;
   wherein acquiring, by the cloud computing data centre, the one or more security service types selected by the tenant comprises:
      after receiving the resource list sent by the tenant, determining, by the cloud computing data centre, at least one security service type of the virtual machine tenanted by the tenant;
      providing, by the cloud computing data centre, at least one or more determined security service types suitable for the virtual machine for the tenant to select from an optional security service type list; and
      receiving, by the cloud computing data centre, information about one or more security service types comprising one or more security service types selected by the tenant from the optional security service type list;
   executing, by the cloud computing data centre, at least one security service on the virtual machine tenanted by the tenant according to the one or more security service types selected by the tenant and the requested strength; and
   feeding back, by the cloud computing data centre, to the tenant a result of executing the at least one security service, wherein the tenant selects whether to increase the strength of the at least one security service based upon the result.

2. The method for customizing the security service according to claim 1, wherein providing, by the cloud computing data centre, the one or more determined security service types suitable for the virtual machine for the tenant to select comprises:
   generating the optional security service type list from the determined security service types suitable for the virtual machine, wherein the optional security service type list comprises multiple entries and each entry corresponds to information about one optional security service type;
   wherein receiving, by the cloud computing data centre, the information about the one or more security service types selected by the tenant comprises:
      receiving, by the cloud computing data centre, a selected security service type list returned by the tenant, wherein the selected security service type list contains one or more optional security service types selected by the tenant.

3. The method for customizing the security service according to claim 1, wherein determining, by the cloud computing data centre, the at least one security service type of the virtual machine tenanted by the tenant after receiving the resource list sent by the tenant comprises:
   determining according to the parameter of the virtual machine, by the cloud computing data centre, at least one of the one or more security service types suitable for the virtual machine as one or more optional security service types of the optional security service type list.

4. The method for customizing the security service according to claim 1, wherein acquiring, by the cloud computing data centre, the one or more security service types selected by the tenant further comprises:
   configuring a virtual machine security service type list of the tenant in a security component of an access gateway, wherein the virtual machine security service type list comprises the one or more security service types selected by the tenant.

5. The method for customizing the security service according to claim 4, wherein acquiring, by the cloud computing data centre, the one or more security service types selected by the tenant further comprises:
   in a case that the tenant accesses the cloud computing data centre through the access gateway, sending, by the security component, the virtual machine security service type list to the cloud computing data centre; and
   determining according to the virtual machine security service list, by the cloud computing data centre, the one or more security service types selected by the tenant.

6. The method for customizing the security service according to claim 1, wherein acquiring, by the cloud computing data centre, the one or more security service types selected by the tenant comprises:
   wherein the virtual machine application also includes at least one security service type requested by the tenant;
   determining, by the cloud computing data centre, at least one optional security service type of the optional security service type list according to the parameter of the virtual machine and the at least one security service requested by the tenant; and
   determining, by the cloud computing data centre, the at least one optional security service type of the optional security service list as one of the one or more security service types selected by the tenant.

* * * * *